J. E. WEBSTER.
INDUCTION MOTOR WINDING.
APPLICATION FILED JULY 6, 1908.
1,101,672.
Patented June 30, 1914.
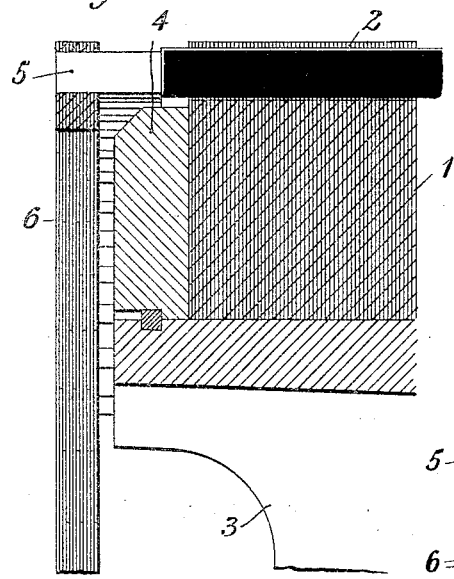
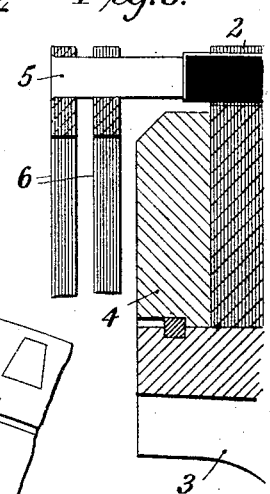
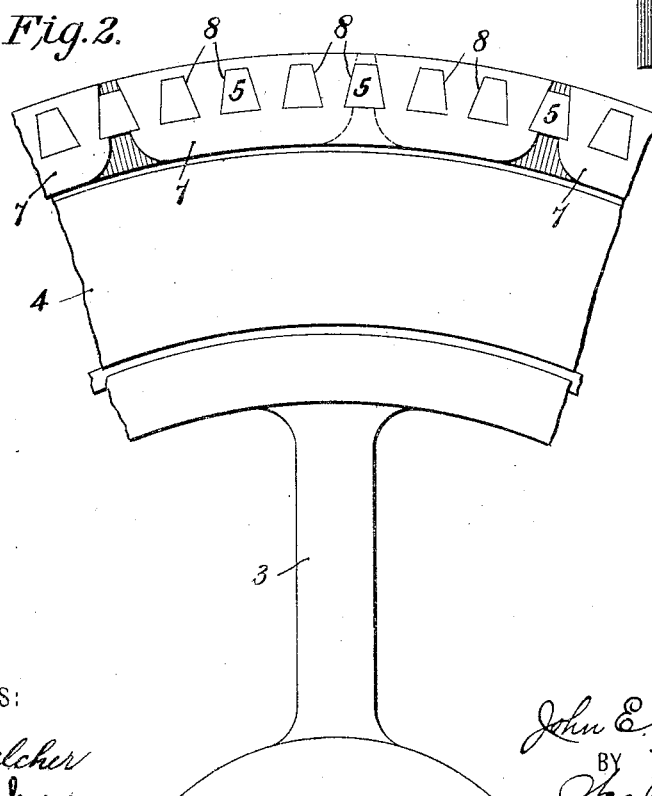
WITNESSES:
C. L. Belcher
R. J. Dearborn
INVENTOR
John E. Webster
BY
Seeley G. Carr
ATTORNEY

UNITED STATES PATENT OFFICE.

JOHN E. WEBSTER, OF PITTSBURGH, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

INDUCTION-MOTOR WINDING.

1,101,672.

Specification of Letters Patent. Patented June 30, 1914.

Application filed July 6, 1908. Serial No. 442,208.

*To all whom it may concern:*

Be it known that I, JOHN E. WEBSTER, a citizen of the United States, and a resident of Pittsburgh, in the county of Allegheny and State of Pennsylvania, have invented a new and useful Improvement in Induction-Motor Windings, of which the following is a specification.

My invention relates to dynamo-electric machines and it has special reference to windings for the secondary members of induction motors.

The object of my invention is to provide improved short-circuiting end rings for induction motor windings of the cage type that shall be relatively inexpensive to construct and that shall maintain an excellent electrical connection with the bar conductors upon the ends of which they are mounted.

In order to accomplish the aforesaid objective results I combine a plurality of ring segment laminæ having dove-tail-shaped openings, with bar conductors of dove-tail form in cross section, by seating the ends of the conductors in said openings.

Figure 1 of the accompanying drawings is a sectional elevation of a portion of a rotor of an induction motor having a cage winding constructed in accordance with my invention. Fig. 2 is an end elevation of the motor portion shown in Fig. 1, and Fig. 3 is a view similar to Fig. 1 which illustrates a slightly modified end ring construction.

Referring to Figs. 1 and 2 of the drawings, a magnetizable core structure 1, having the usual slots 2 near its periphery, is mounted on a spider 3 and is held in position by clamping rings 4. Rods or bars 5 of conducting material are partially located in the slots 2 and project outwardly therefrom to form portions of an induction motor winding of the squirrel-cage type. The ends of the bars or rods 5 are short-circuited by rings 6 composed of segments 7 each of which is a punched or stamped plate of conducting material having a plurality of openings 8 which are adapted to fit closely over the ends of the bars 5. The ends of each segment 7 are notched to engage the sides of two bars that are connected together by another segment, the complete ring comprising a plurality of segments so disposed that the spaces between them are staggered. By this means, adjacent segments in the same plane are materially separated from each other so that the radiating surface of the assembled ring is increased. The shape of the openings in the end rings and the corresponding shape of the bars is susceptible of modification but I prefer the dove-tail form illustrated in the drawings for the following reasons: The wedging action between the bars and the ring segments produces an excellent electrical connection between the inner and side surfaces of the bars and the corresponding walls of the ring openings and serves to effectively withstand the action of centrifugal force to which the bars are subjected in operation, and also insures a maximum amount of surface contact between the bars and the ring segments. The large side-surface contact is important because the portions of the rings which are outside the bars are necessarily thin and, in fact, may be omitted entirely in some cases.

It may be found desirable to divide the complete ring into parts, as shown in Fig. 3, in order to still further improve the ventilation of the winding. The electrical connection between the ring segments which are pressed close together, may be improved by a well known soldering process, if desired.

I claim as my invention:

1. In a cage winding for dynamo-electric machines, the combination with a plurality of bars having dove-tail form in cross section, of short circuiting end rings therefor, comprising laminated segmental rings having dove-tail openings to receive the ends of the bars, the ring segments in each plane being spaced apart and those in adjacent planes being in staggered relation to each other.

2. A cage winding comprising bars of wedge shape and relatively large radial depth in cross section and having their narrow edges disposed outwardly, and laminated end rings having holes of the same form as the ends of the bars and fitted thereon, whereby a wedging action takes place between contact surfaces of the bars and rings.

3. A cage winding comprising bars of dove-tail form in cross section and laminated end rings having holes in which the ends of the bars are seated, the laminæ in each plane being composed of spaced segments.

In testimony whereof, I have hereunto subscribed my name this 2nd day of July, 1908.

JOHN E. WEBSTER.

Witnesses:
VERYL BROUGHTON,
BIRNEY HINES.